(12) United States Patent
Lauderbaugh

(10) Patent No.: US 6,752,074 B2
(45) Date of Patent: Jun. 22, 2004

(54) MACHINE FOR MANUFACTURING CORRUGATED BOARD WITH PRESSURE APPLICATOR STABILIZERS

(75) Inventor: David Lauderbaugh, Roswell, GA (US)

(73) Assignee: Corrugated Gear & Services, Inc., Alpharetta, GA (US)

(*) Notice: Subject to any disclaimer, the term of this patent is extended or adjusted under 35 U.S.C. 154(b) by 69 days.

(21) Appl. No.: 10/192,955

(22) Filed: Jul. 11, 2002

(65) Prior Publication Data

US 2004/0007332 A1 Jan. 15, 2004

(51) Int. Cl.[7] .............................. B30B 5/04; B31F 1/20
(52) U.S. Cl. ...................... 100/311; 100/154; 156/470; 156/580; 156/583.5; 156/583.91
(58) Field of Search ................................ 100/311, 154, 100/151, 193, 202, 258 R, 258 A; 156/210, 470, 580, 583.1, 583.91, 583.5; 34/144, 624, 659

(56) References Cited

U.S. PATENT DOCUMENTS

| | | | | |
|---|---|---|---|---|
| 3,676,268 A | * | 7/1972 | Brandenburg et al. | 156/548 |
| 5,248,362 A | * | 9/1993 | Sissons | 156/205 |
| 5,439,544 A | * | 8/1995 | Bory | 156/210 |
| 5,466,329 A | * | 11/1995 | Marschke | 156/470 |
| 5,526,739 A | * | 6/1996 | Lauderbaugh et al. | 100/306 |
| 5,611,267 A | * | 3/1997 | Lauderbaugh | 100/38 |
| 5,711,214 A | * | 1/1998 | Lauderbaugh et al. | 100/48 |
| 5,732,622 A | * | 3/1998 | Lauderbaugh | 100/306 |
| 5,791,239 A | * | 8/1998 | Lauderbaugh et al. | 100/48 |
| 5,902,502 A | * | 5/1999 | Sissons et al. | 219/388 |
| 5,915,295 A | * | 6/1999 | Lauderbaugh | 100/38 |
| 6,257,296 B1 | * | 7/2001 | Pallas et al. | 156/470 |
| 6,390,963 B1 | * | 5/2002 | Lauderbaugh | 493/463 |

* cited by examiner

*Primary Examiner*—Gladys J P Corcoran
(74) *Attorney, Agent, or Firm*—Michael J. Mehrman; Mehrman Law Office PC

(57) ABSTRACT

A machine for manufacturing corrugated board that includes a row of pressure applicators aligned substantially transverse to the direction of machine flow and configured to press a web of corrugated board against a heated platform. To prevent the pressure applicators from tilting when incompletely overlying the web of corrugated board, the machine includes a stabilizer configured to prevent one or more of the pressure applicators from tilting. The stabilizer may include support plates connected to the pressure applicators and a stabilizer strap connecting two of the support plates to prevent the pressure applicator from tilting. Alternatively, the stabilizer may include support plates connected to the pressure applicators and one or more alignment members to prevent the pressure applicator from tilting. The alignment members may be alignment blocks or rollers.

17 Claims, 9 Drawing Sheets

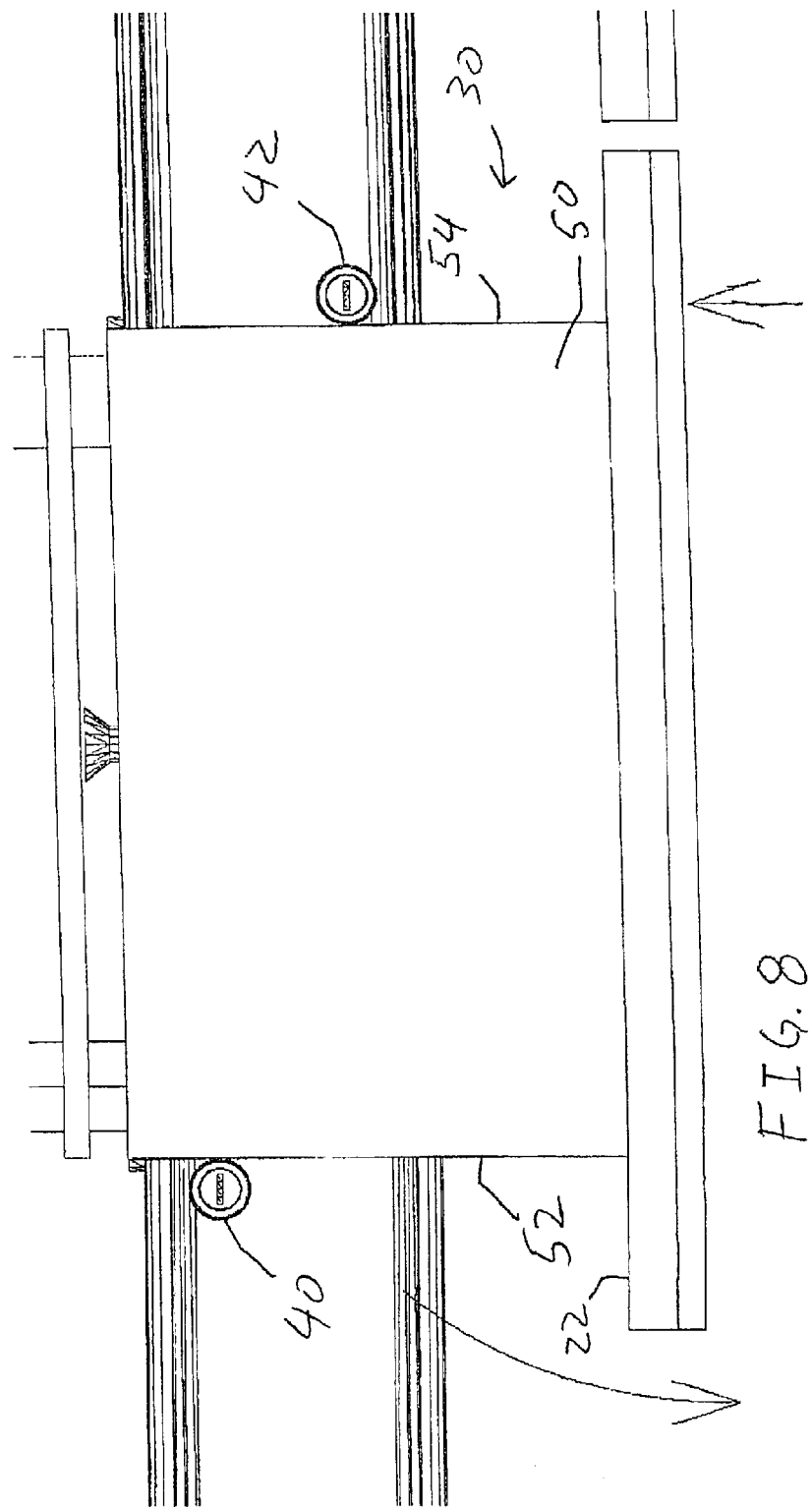

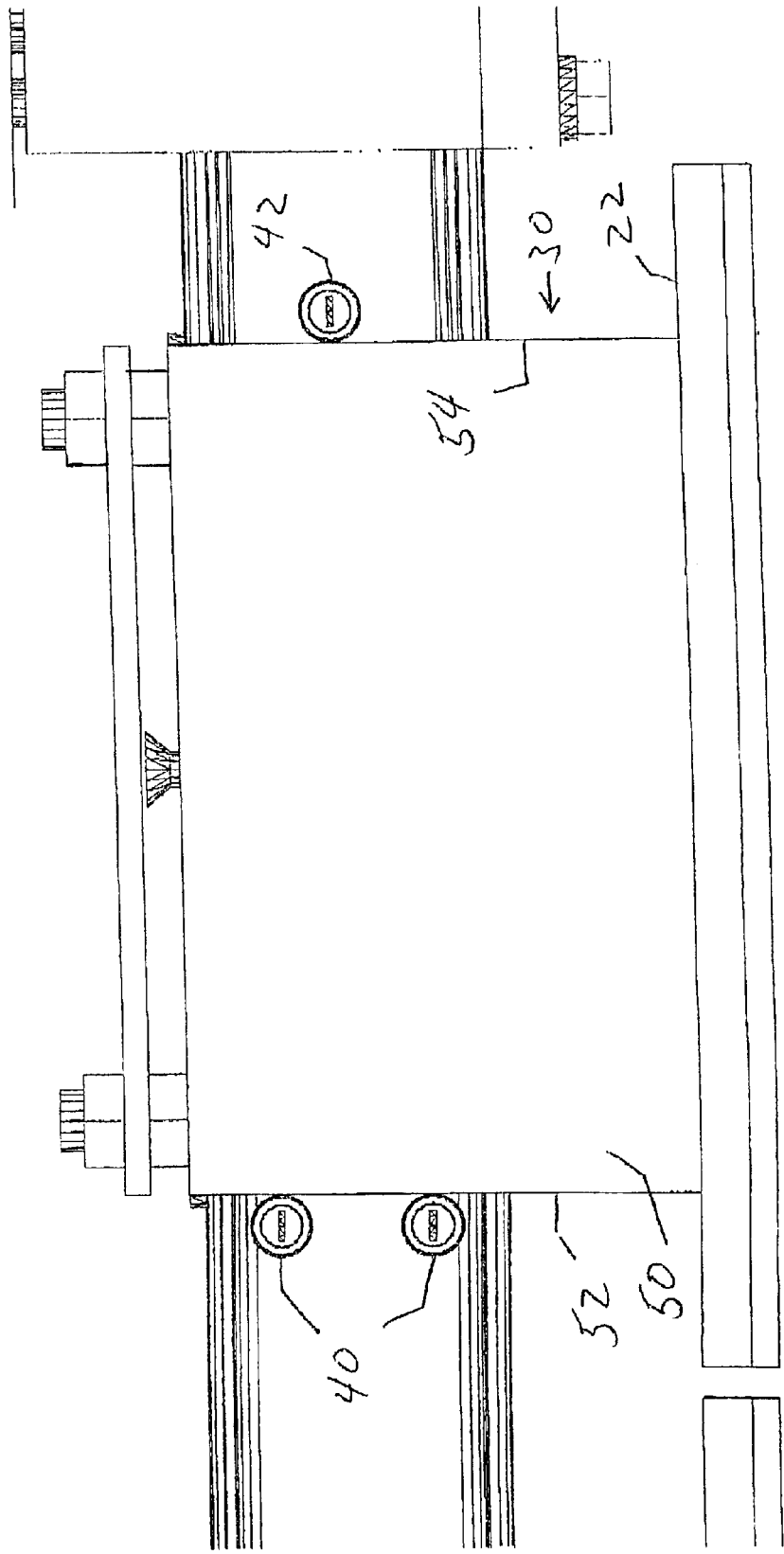

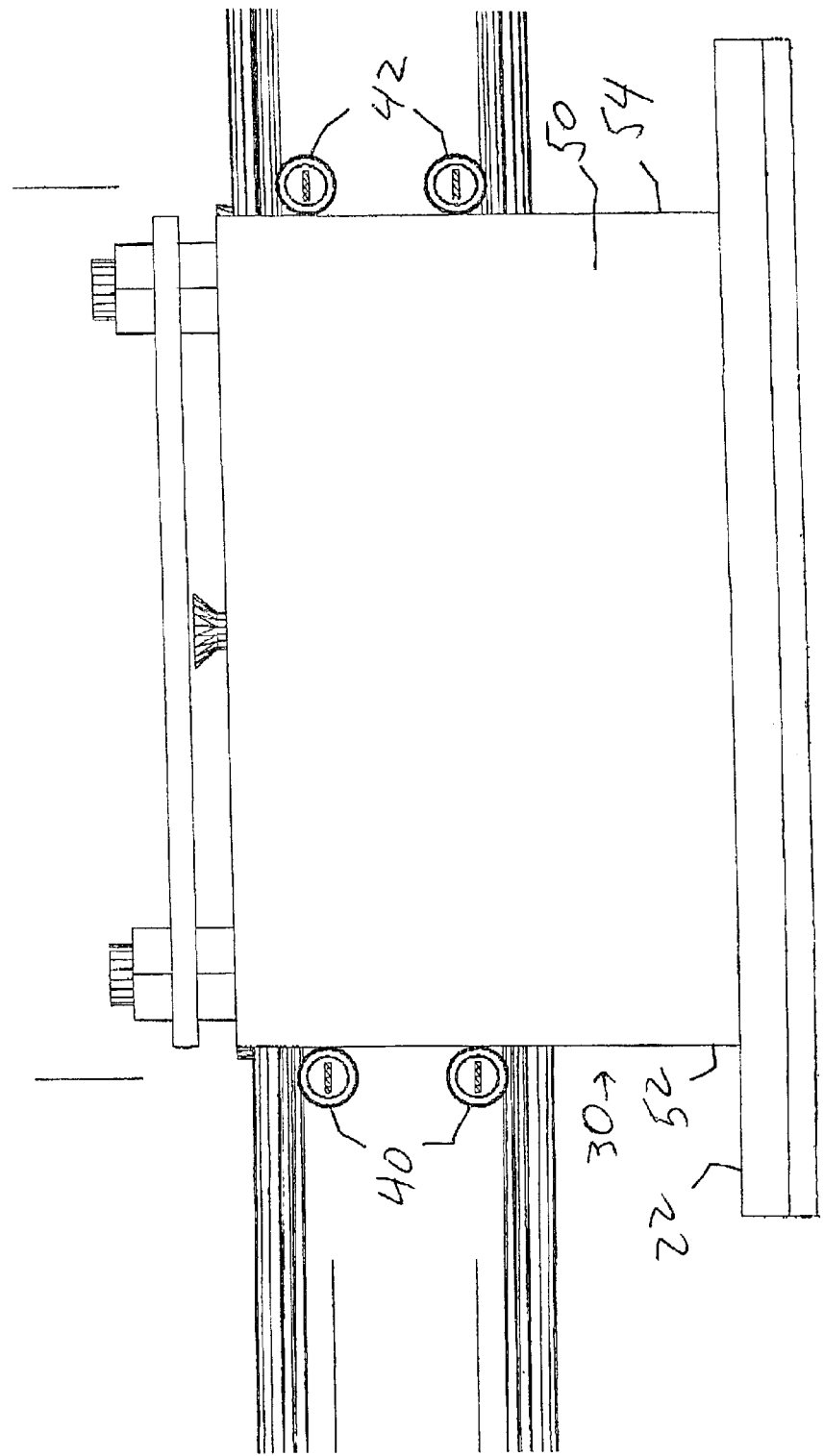

MACHINE FOR MANUFACTURING CORRUGATED BOARD WITH PRESSURE APPLICATOR STABILIZERS

REFERENCED TO RELATED APPLICATIONS

This application incorporates by reference the disclosure of commonly-owned U.S. Pat. No. 6,390,963 entitled "Corrugated Board Manufacturing Apparatus Including a Preheater Section with a Variable Heat Transfer System and a Hotplate Section with a Passive Hold-Down Mechanism" issued on May 21, 2002.

TECHNICAL FIELD

This invention relates to machines for manufacturing cardboard boxes and, more specifically, relates to a machine with stabilizers that prevent the pressure applicators from tilting when they partially overlie a web of corrugated board.

BACKGROUND OF THE INVENTION

Machines for manufacturing corrugated board may include a segmented hold-down structure consisting of a grid of pressure applicators including a number of rows, each including a number of individual pressure applicators. These pressure applicators press a moving web of corrugated board against a heated platform, such as a steam chest, to dry the board and set the glue as the web of corrugated board is propelled through the machine. In a belt driven machine, the pressure applicators directly press against a conveyor belt, which in turn presses the board against the steam chest, as the conveyor belt propels the board through the machine. In a beltless machine, the pressure applicators press directly against the corrugated board, which is typically pulled through the steam chest section of the machine by a vacuum or belt drive located downstream from the steam chest.

For either type of machine, segmenting the pressure applicator structure into a grid of pressure applicators allows the number of rows engaging the board in the direction of machine flow to be varied in response to the speed of the machine and the thickness of the corrugated board. In addition, segmenting each row of pressure applicators into a number of separate pressure applicators in the cross-machine direction allows the number of pressure applicators engaging the board to be varied in response to the width of the corrugated board. In addition, the pressure applied by the pressure applicators in the cross-machine direction may be varied to apply a desired pressure profile to the board.

An inexpensive yet effective pressure applicator structure including passive pressure applicators is described in commonly-owned U.S. Pat. No. 6,390,963 entitled "Corrugated Board Manufacturing Apparatus Including a Preheater Section with a Variable Heat Transfer System and a Hotplate Section with a Passive Hold-Down Mechanism." In this machine, the downward pressure applied by the pressure applicators are not actively controlled. Instead, the pressure applicators are individually weighted to impart a desired pressure profile on the underlying board. The use of passive pressure applicators eliminates much of the machine's control system, which results in an inexpensive machine that is east to set up and operate.

In this type of machine, one or more pressure applicators at each end of each row typically include actuators, such as air cylinders, to independently lift a corresponding pressure applicator off the underlying board. This feature allows the machine to accommodate less than full-width board. Typically, each row includes eight hold-down pressure applicators with the outermost two pressure applicators at the end of each row including independent lifting actuators. This allows the center four, the center six, or all eight hold-down feed to engage the corrugated board of varying width.

With this type of machine, however, the pressure applicators pressing down against the edges of the corrugated board do not always overlie the board completely. In particular, when less than half of a pressure applicator overlies the edge of the board, the pressure applicator can tilt. When this happens, the edge of the board can be pinched, and a portion of the board may not receive adequate downward pressure. This causes the board to be manufactured improperly, which results in waste board. In addition, the pressure applicator may press the conveyor belt against the steam chest, which can quickly destroy the conveyor belt.

Therefore, a need exists for a segmented pressure applicator system that prevents individual pressure applicators from tilting when incompletely overlying a web of corrugated board.

SUMMARY OF THE INVENTION

The present invention meets the needs described above in a machine for manufacturing corrugated board that includes a heated platform and a conveyor for propelling a web of corrugated board adjacent to the heated platform in a machine direction. The machine also includes a row of pressure applicators aligned substantially transverse to the direction of machine flow and configured to press the web of corrugated board against the heated platform. To prevent the pressure applicators from tilting when incompletely overlying a web of corrugated board, the machine includes a stabilizer configured to prevent a corresponding pressure applicator from tilting while applying pressure to the web of corrugated board.

Each pressure applicator may be independently weighted, and the weights of the pressure applicators may be selected to impart a desired pressure profile to the web. The machine may also include a lifting apparatus for lifting a corresponding pressure applicator independently of the other pressure applicators. In particular, the stabilizer may include a connector, such as a flexible strap or rigid bar, securing two pressure applicators to each other. For example, the connector may secure a right end pressure applicator to a left end pressure applicator. And a second connector may secure a right second position pressure applicators to a left second position pressure applicator. In this case, the right second position pressure applicator is typically located adjacent to the right end pressure applicator, and the left second position pressure applicators is typically located adjacent to the left end pressure applicator.

To remove pressure from the web, a support bar configured to lift a row of pressure applicators may be moved from a lower position to an upper position. The support bar is configured to lift the pressure applicators above the corrugated board when moved to the upper position, and to permit the pressure applicators to move vertically with respect to the support bar when moved to the lowered position to remove the weight of the pressure applicator from the support bar and to apply the weight of the pressure applicators to the corrugated board. To implement the stabilizer, a support structure is coupled to a pressure applicator, and one or more alignment members are supported by the support bar and configured to limit lateral movement of the support structure to permit the support structure to move vertically with respect to the support bar while preventing the pressure applicator from tilting.

For example, the support structure may include a support surface and one or more alignment members supported by the support bar and positioned adjacent to the support surface to limit lateral movement of the support structure while permitting the support structure to move vertically with respect to the support bar. Each support structure may include one or more support surfaces and one or more alignment members positioned adjacent to the support surfaces. For example, the support surface may be defined by the edge of a support plate, and the alignment members may include one or more alignment blocks or rollers.

More specifically described, a first embodiment of invention includes a machine for manufacturing corrugated board including a heated platform and a conveyor for propelling a web of corrugated board adjacent to the heated platform in a machine direction. The machine also includes a row of pressure applicators aligned substantially transverse to the direction of machine flow and configured to press the web of corrugated board against the heated platform. To prevent the pressure applicators from tilting when incompletely overlying a web of corrugated board, the machine includes a first stabilizer including a connector securing opposing end position pressure applicators to each other to prevent the end position pressure applicators from tilting while applying pressure to the web of corrugated board. The machine may also include a second stabilizer including a connector securing opposing second position pressure applicators to each other to prevent the second position pressure applicators from tilting while applying pressure to the web of corrugated board. Typically, each second position pressure applicator is located adjacent to a corresponding end position pressure applicator. The connector may include a flexible strap or rigid bar connecting support structures to each other. Each support structure, such as an "L" bracket, is typically attached to an associated pressure applicator.

A second embodiment of the invention includes a machine for manufacturing corrugated board including a heated platform, a conveyor for propelling a web of corrugated board adjacent to the heated platform in a machine direction, and a row of pressure applicators aligned substantially transverse to the direction of machine flow and configured to press the web of corrugated board against the heated platform. The machine also includes a support bar selectively supporting the row of pressure applicators that may be moved from an upper position to a lower position. The support bar is configured to lift the pressure applicators above the corrugated board when moved to the upper position, and to permit the pressure applicators to move vertically with respect to the support bar when moved to the lowered position to remove the weight of the pressure applicator from the support bar and to apply the weight of the pressure applicators to the corrugated board. The machine also includes a first support structure coupled to a pressure applicator, such as a right end pressure applicator, and one or more alignment members supported by the support bar and positioned to the first support structure to permit the first support structure to move vertically with respect to the support bar while preventing the right end position pressure applicator from tilting.

The machine may also include a second support structure coupled to a left end pressure applicator, and one or more alignment members supported by the support bar and positioned adjacent to the second support structure to permit the second support structure to move vertically with respect to the support bar while preventing the left end pressure applicator from tilting. The machine may also include a third support structure coupled to a right second pressure applicator, and one or more alignment members supported by the support bar and positioned adjacent to the third support structure to permit the third support structure to move vertically with respect to the support bar while preventing the right second position pressure applicator from tilting. The machine may also include a fourth support structure coupled to a left second position pressure applicator, and one or more alignment members supported by the support bar and positioned adjacent to the fourth support structure to permit the fourth support structure to move vertically with respect to the support bar while preventing the left second position pressure applicator from tilting.

In various alternatives, each support structure may include a support surface and an alignment block positioned adjacent to the support surface, a support surface and one or more rollers adjacent to the support surface, two support surfaces and one roller adjacent to each support surface, two support surfaces and two rollers adjacent- to each support surface, or two support surfaces, two rollers adjacent to one of the surfaces, and one roller adjacent to the other support surface. In addition, each support structure may comprise a support plate attached to the pressure applicator.

The specific techniques and structures employed by the invention to improve over the drawbacks of prior pressure applicator structures and accomplish the advantages described above will become apparent from the following detailed description of the embodiments of the invention and the appended drawings and claims.

BRIEF DESCRIPTION OF THE DRAWINGS

FIG. 8 is a front view of a pressure applicator including a stabilizer with two rollers to prevent the pressure applicator from tilting.

FIG. 9 is a front view of a pressure applicator including a stabilizer with three rollers to prevent the pressure applicator from tilting.

FIG. 10 is a front view of a pressure applicator including a stabilizer with four rollers to prevent the pressure applicator from tilting.

DETAILED DESCRIPTION OF THE EMBODIMENTS

The present invention may be embodied in a machine for manufacturing corrugated board with a segmented pressure applicator structure with one or more stabilizers configured to prevent one or more pressure applicators from tilting while applying pressure to the web of corrugated board. Several types of stabilizers may be deployed. For example, a first type of stabilizer ties two pressure applicators together to prevent them from tilting. Another type of stabilizer includes a support structure, such as a support plate, coupled to a pressure applicator. This type of stabilizer also includes an alignment mechanism positioned adjacent to the support structure to prevent the pressure applicator from tilting. For example, the support structure may include a support plate attached to a pressure applicator with one or more edges defining support surfaces. The alignment mechanism may include one or more alignment blocks or rollers located adjacent to each support surface.

It should be appreciated that any of these stabilizers may be deployed on a machine for manufacturing corrugated board, or they may be deployed in combination. The stabilizers may be deployed on a new machine, or they may be deployed as a retrofit to an existing machine. In addition, stabilizers are typically only deployed for the end pressure applicators of a cross-machine row, or two end pressure applicators on each end of a cross-machine row. This is because corrugated board requiring a narrower pressure applicator structure is seldom encountered. However, additional stabilizers could be added if desired. In addition, the embodiments of the invention described below include certain structures, such as support plates, straps, bars, block and rollers. However, it should be appreciated that these components may be replaced by equivalent structures configured to accomplish a similar purpose.

Figure 1A:
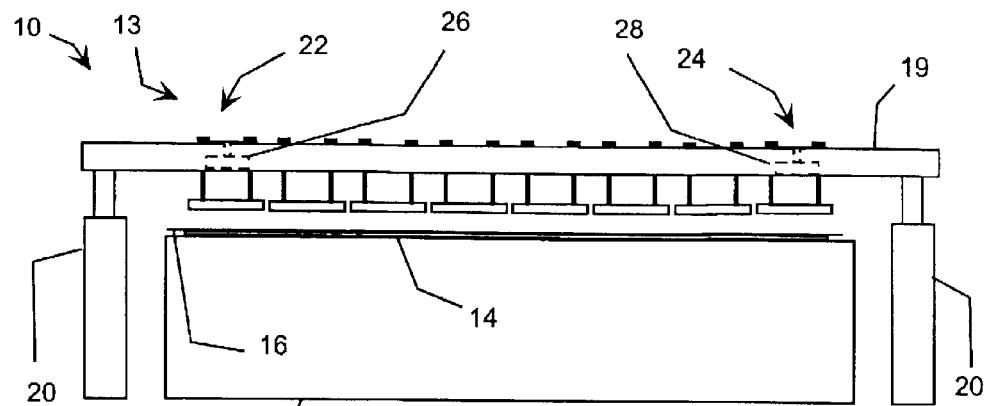
FIGS. 1A, 1B and 1C are plan views of a prior art pressure applicator structure for a machine for manufacturing corrugated board.
Figure 1B:
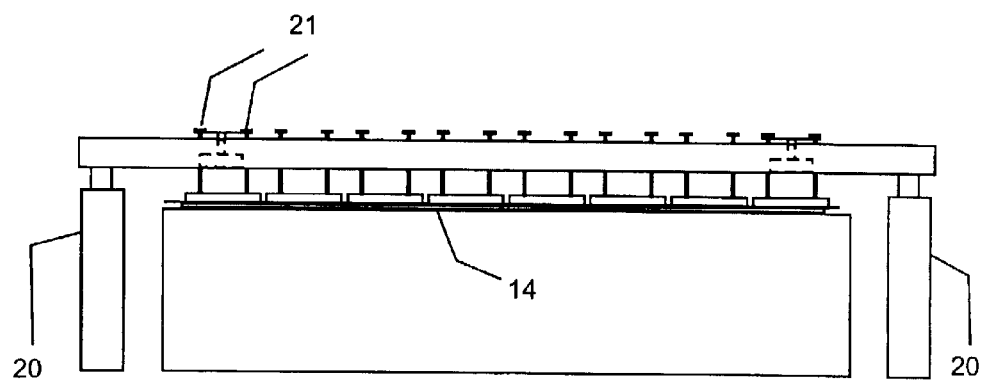
Figure 1C:
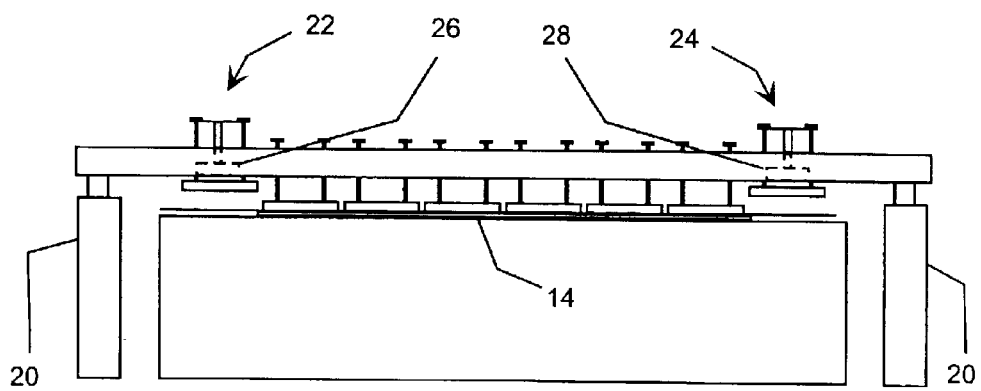

Turning now to the drawings, in which like element numerals indicate like elements throughout the several figures, FIGS. 1A, 1B and 1C are plan views of a prior art machine for manufacturing corrugated board 10 including a heated platform 12, such as a steam chest, and a row of pressure applicators 13. The machine 10 is described in more detail in commonly-owned U.S. Pat. No. 6,390,963 entitled "Corrugated Board Manufacturing Apparatus Including a Preheater Section with a Variable Heat Transfer System and a Hotplate Section with a Passive Hold-Down Mechanism" issued on May 21, 2002, which is incorporated into this specification by reference.

Although FIGS. 1A–C illustrate only one row of the pressure applicator structure 13, the machine 10 may include a number of similar rows, such as twenty. Each pressure applicator serves to press a web of corrugated board 14 against the steam chest 12 to dry the board and set the glue as the corrugated board is propelled through the machine. In the belt driven machine illustrated in FIGS. 1A–C, the pressure applicators 13 directly press against a conveyor belt 16, which in turn presses the board 14 against the steam chest 12, as the conveyor belt 16 propels the board 14 through the machine 10. The pressure applicator stabilizers described below may also be deployed with a beltless machine, in which the pressure applicators 13 press directly against the corrugated board 14. In this type of machine, the web of corrugated board 14 is typically pulled through the steam chest section of the machine by a vacuum or belt drive located downstream from the steam chest 12.

The machine 10 includes a support bar 18 that supports the row of pressure applicators 13. The machine also includes one or more actuators 20, such as an air cylinder, for raising and lowering the support bar 18. When the support bar 18 is in the upper position, as shown in FIG. 1A, the pressure applicators 13 are lifted above the board 14 and do not press the board against the steam chest 12. In particular, the support bar 14 lifts each pressure applicator by lifting a pair of support piers 21 that rest on the topside of the support bar 18. However, support piers 21 are not otherwise constrained by the support bar 18, which allows the pressure applicator to move vertically with respect to the support bar 18 when the pressure applicators are lowered into contact with the underlying conveyor belt 16 and board 14. This shifts the weight of the pressure applicators 13 from the support bar 18 to the conveyor belt 16 and board 14 when the support bar 18 is in the lower position, as shown in FIG. 1B. The pressure applicators 13 may be individually weighted to apply a desired pressure profile to the board 14, and the downward pressure applied by the pressure applicators 13 may not be otherwise controlled. The use of this type of passive hold-down structure eliminates much of the machine's control system, which results in an inexpensive machine that is east to set up and operate.

To accommodate board 14 that is less than the full width of the row of pressure applicators 13, the left and right end pressure applicators 22 and 24 of the row may be independently lifted by actuators 26 and 28, respectively, as shown in FIG. 1C. Although air cylinders operate well as the actuators 26 and 28, they may be implemented using hydraulic cylinders, air bags, ball screws, scissors lifts, or any other suitable lifting device. Although only the left and right end pressure applicators 22 and 24 are shown with actuators 26 and 28, respectively, each row of pressure applicators may include eight hold-down pressure applicators with the outermost two pressure applicators at the end of each row including independent lifting actuators. That is, the left second position pressure applicator 36 and the right second position pressure applicator 38 may also include actuators. This configuration allows the center four, the center six or all eight hold-down feed to engage the corrugated board to accommodate corrugated board of varying width. Of course, a different number of pressure applicators may be included in each row, and a different number of pressure applicators of each row may include stabilizers, as desired.

Figure 2A:
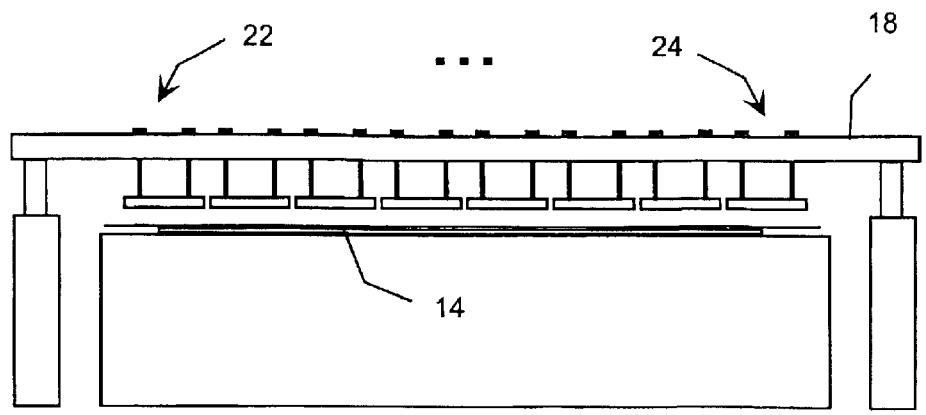
FIGS. 2A and 2B are plan views of a prior art pressure applicator structure for a machine for manufacturing corrugated board illustrating tilted pressure applicators that can occur with this type of machine.
Figure 2B:
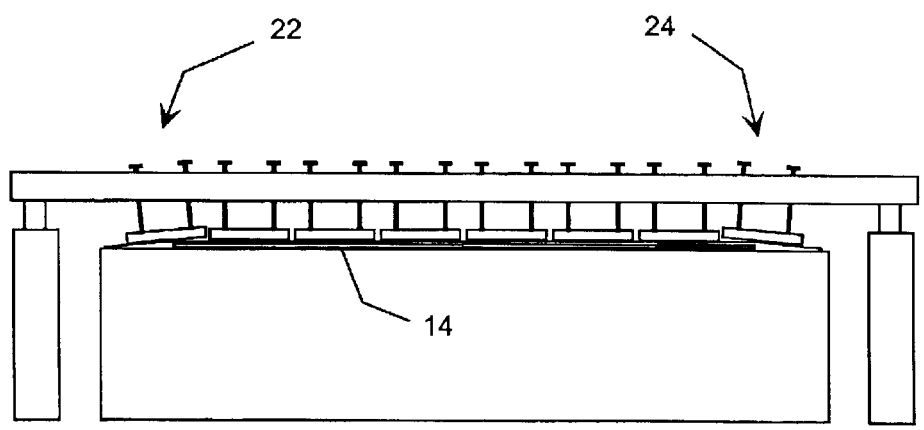

FIGS. 2A and 2B are plan views of the prior art machine 10 illustrating tilted pressure applicators that can occur with this type of system. Specifically, when the corrugated board 14 underlie less than half of a pressure applicator, as shown in FIG. 2A for the left and right end pressure applicators 22 and 24, these pressure applicators can tilt as shown in shown in FIG. 2B. When this happens, the edge of the board 14 can be pinched, and a portion of the board may not receive adequate downward pressure. This causes the board to be manufactured improperly, which results in waste board. In addition, the tilted pressure applicator may press the conveyor belt 16 against the steam chest 12, which can destroy the conveyor belt. This potential for tilting is solved by the stabilizers described below.

Figure 3:
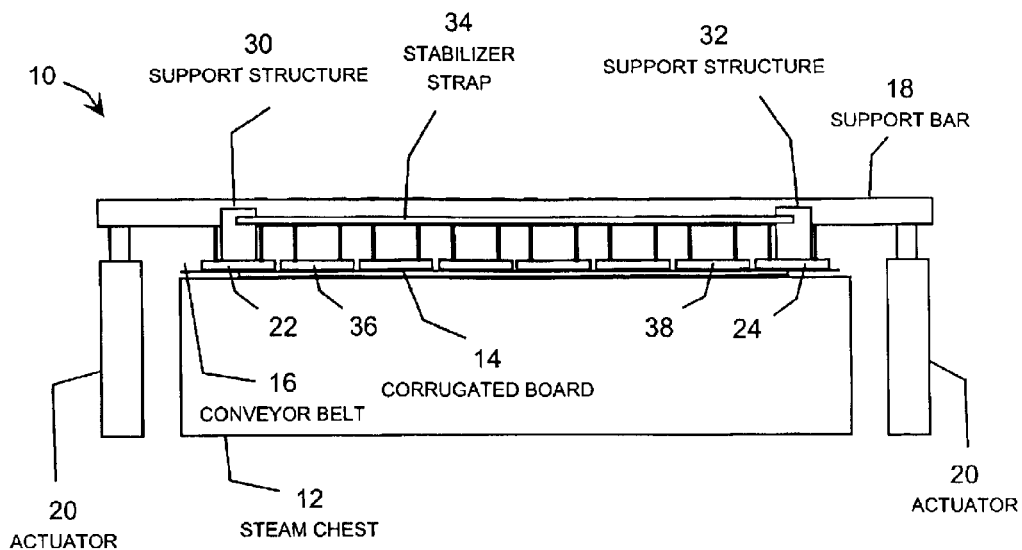
FIG. 3 is a plan view of a pressure applicator structure for a machine for manufacturing corrugated board including a first type of stabilizer for preventing the pressure applicators from tilting.

FIG. 3 is a plan view of a pressure applicator structure for a machine for manufacturing corrugated board 10 including a first type of stabilizer for preventing a pair of pressure applicators from tilting. The stabilizer includes a first support structure 30, such as a stabilizer bracket in the form of an "L" bracket, attached to the left end pressure applicator 22, and a second support structure 32 attached to the right end pressure applicator 24. To prevent these pressure applicators from tilting, a stabilizer strap 34 connects the left end support structure 30 to the right end support structure 32.

The support structure typically includes a support plate, such as a vertical section of an "L" bracket, or any other suitable type of support structure. For example, the support structure may include a vertical bar, a rod, a flange or any other type of structure that can be coupled to the pressure applicators and constrained to prevent the pressure applicators from tilting. In addition, the stabilizer strap 34 may be any suitable type of flexible or rigid connector. For example, the stabilizer strap 34 may be a flexible connector such as a cord, cable, chain, or canvas band. Alternatively, the stabilizer strap 34 may be a rigid connector, such as a bar, a rod, or any other type of connector that can effectively couple the support structures 30 and 32 to each other to prevent the pressure applicators 22 and 24 from tilting.

Figure 4:
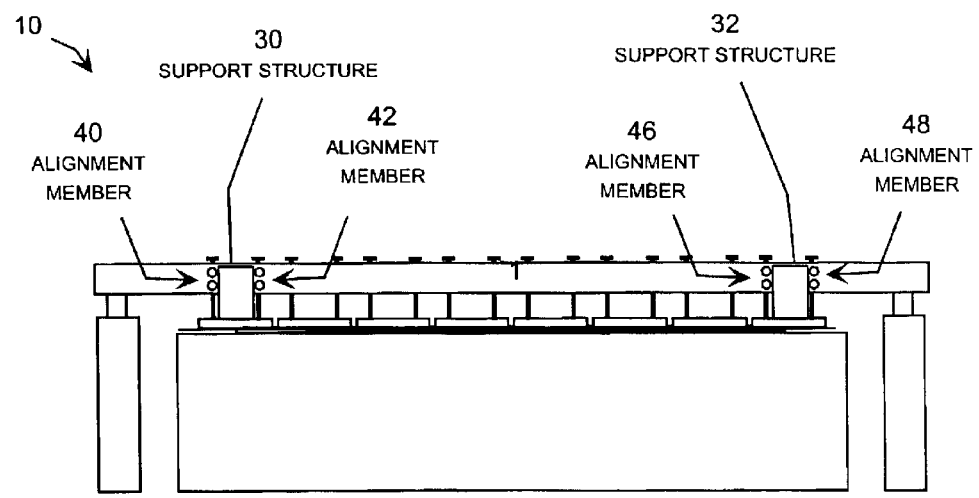
FIG. 4 is a plan view of a pressure applicator structure for a machine for manufacturing corrugated board including a second type of stabilizer for preventing the pressure applicators from tilting.

FIG. 4 is a plan view of a pressure applicator structure for the machine 10 including a second type of stabilizer. This stabilizer includes first support structure 30 attached to the left end pressure applicator 22 and a second support structure 32 attached to the right end pressure applicator 24. The support structure 30 is constrained from tilting by alignment members 40, such as one or more alignment blocks or one or more rollers, supported by the support bar 18 and positioned adjacent to one or more support surfaces. For example, the support surfaces in this embodiment are defined by the left side edge of the support structure 30. This allows the left end pressure applicator 22 with the attached support structure 30 to move vertically with respect to the support bar 18 while preventing the pressure applicator 22 from tilting. Similarly, the support structure 30 may also be constrained from tilting by alignment members 42, which are supported by the support bar 18 and positioned adjacent to the right side edge of the support structure 30.

It should be appreciated that, because narrow board may be invariably run through the center of the machine 10, a particular pressure applicator can only tilt in one direction. That is, each pressure applicator can only tilt away from the center of the machine as shown in FIG. 2B. Therefore, each stabilizer may include only a single alignment member, such as the alignment member 40 shown in FIG. 4. However, a design preference may include alignment members on both sides of a pressure applicator, as illustrated by alignment members 40 and 42 in FIG. 4. The alignment members may be implemented as any type of structure that allows the support structure to move vertically with respect to the support bar while preventing the pressure applicator from tilting. For example, the alignment members 40 and 42 may be blocks or rollers, such as wheels, cam followers, bearings or any other suitable type of rollers. In addition, an alignment member may include one, two, or more blocks or rollers located adjacent to a support surface, and each pressure applicator may include stabilizers on one or both sides of a support structure. When rollers are deployed as the alignment members, the rollers may be mounted on axels supported by the support bar 18 and positioned adjacent to a corresponding support surface. A similar type of stabilizer structure may be deployed for any number of pressure applicators, as desired.

Figure 5:
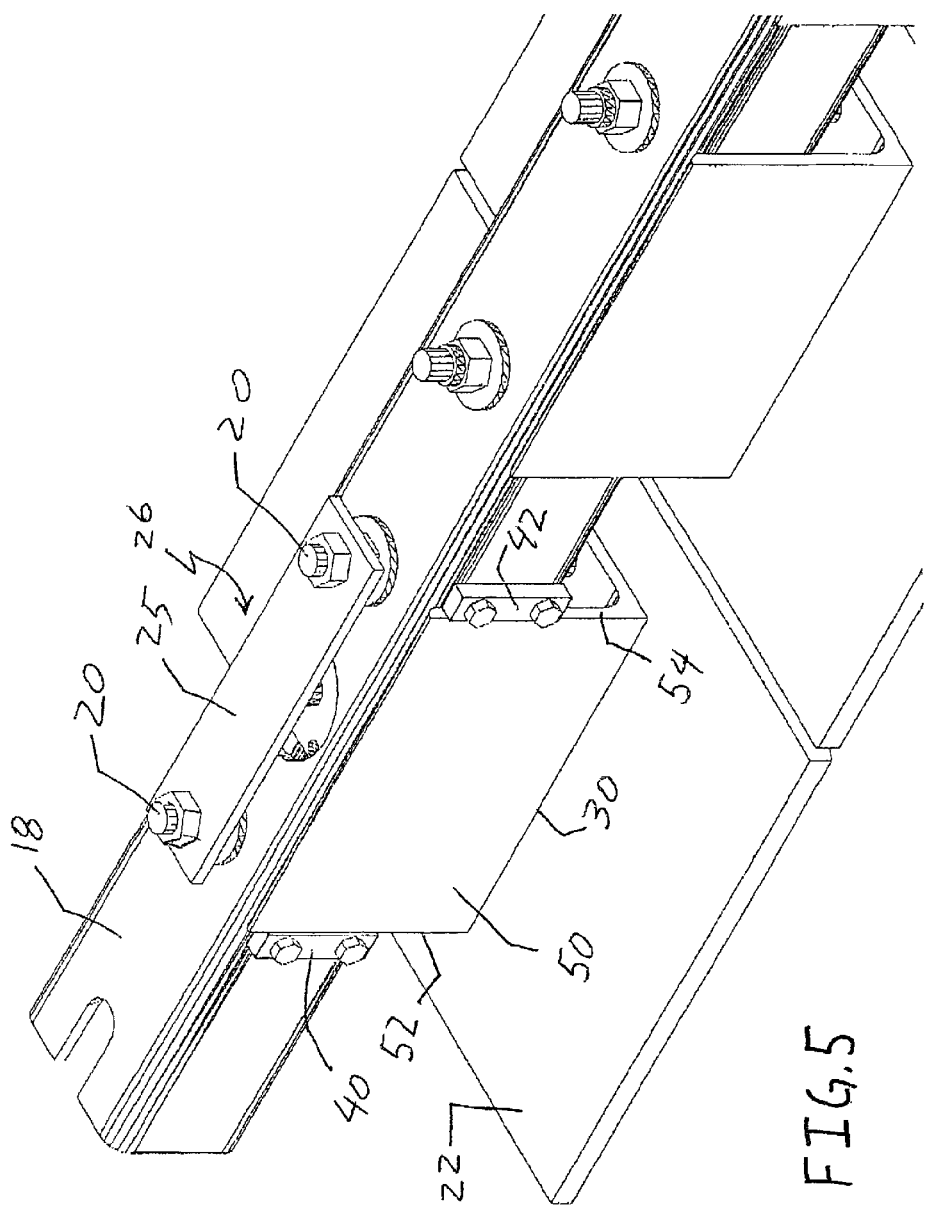
FIG. 5 is a perspective view of pair of pressure applicators in which one pressure applicator includes a support plate and two alignment blocks to prevent the pressure applicator from tilting.

FIG. 5 is a perspective view of an illustrative pressure applicator 22 including a support structure 30 and alignment members 40 and 42 to prevent the pressure applicator from tilting. FIG. 5 illustrates a preferred configuration for the pressure applicator stabilizer shown to scale. The support bar 18 is configured to lift the pressure applicator 22 by lifting the support piers 20, which are spanned by a connector 25. More specifically, a lifting actuator 26, in this instance an air cylinder, lifts the connector 25, which in turn lifts the pressure applicator 22 by the support piers 20. The support structure 30 is in the form of an "L" bracket, typically constructed from steel, which may be welded or bolted to the pressure applicator 22. A vertical support plate 50 of the "L" bracket includes a left support surface 52 defined by a left edge of the support plate 50 and a right support surface 54 defined by a right edge of the support plate 50.

A first alignment member 40, in this case an alignment block, is attached to the support bar 18 and positioned adjacent to the left support surface 52. In addition, a second alignment member 42, again an alignment block, is attached to the support bar 18 and positioned adjacent to the right support surface 54. The alignment block may be constructed from steel, plastic, rubber or any other suitable material. This configuration allows the support structure 30 to move vertically with respect to the support bar 18 while preventing the pressure applicator 22 from tilting.

Figure 6:
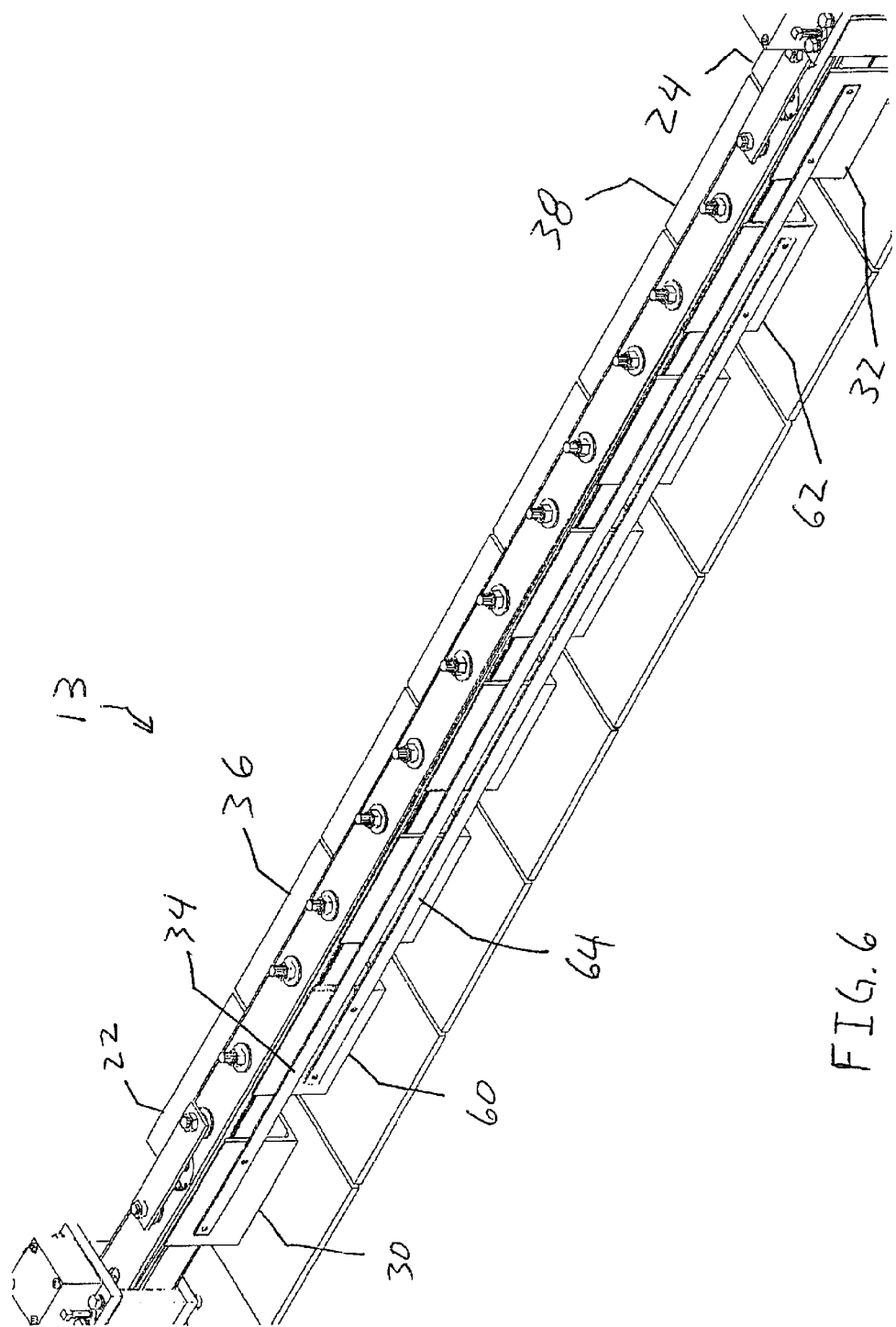
FIG. 6 is a perspective view of a row pressure applicators including two stabilizers to prevent two pressure applicators at either end of the row from tilting.

FIG. 6 is a perspective view of a row of pressure applicators 13 including two stabilizers to prevent two pairs of pressure applicators at either end of the row from tilting. FIG. 6 illustrates a preferred configuration for the pressure applicator stabilizer of FIG. 3 shown to scale. More specifically, the row of pressure applicators 13 includes a left end pressure applicator 22 with an attached support structure 30. The row of pressure applicators 13 also includes a right end pressure applicator 24 with an attached support structure 32. A stabilizer strap 34, which may be a flexible or rigid connector, couples the support structure 30 to the support structure 32 to prevent the pressure applicators 22 and 24 from tilting. Note that implementing the stabilizer strap 34 as a flexible connector, such as a cable or cord, only prevents the pressure applicators 22 and 24 from tilting away from the center of the row pressure applicators 13. This is sufficient in most cases because narrow board may be run through the center of the row pressure applicators 13. The row of pressure applicators 13 also includes a left second position pressure applicator 36 with an attached support structure 60 and a right second position pressure applicator 38 with an attached support structure 62. A second stabilizer strap 64 couples the support structure 60 to the support structure 62 to prevent the pressure applicators 36 and 38 from tilting.

Figure 7:
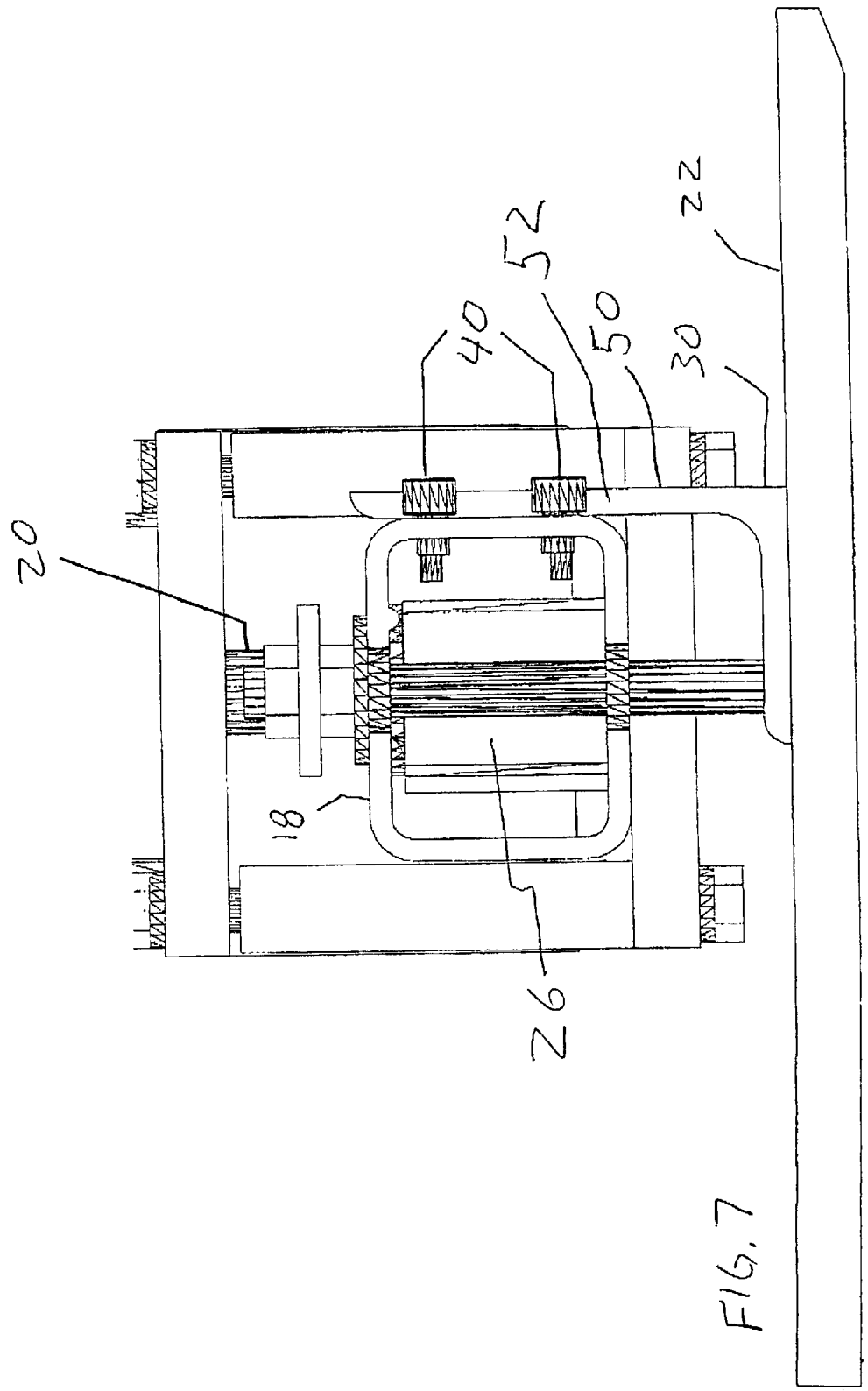
FIG. 7 is a side view of a pressure applicator including a stabilizer to prevent the pressure applicator from tilting.

FIG. 7 is a side view of a pressure applicator 22 including a stabilizer to prevent the pressure applicator from tilting. FIG. 7 illustrates a preferred configuration for the pressure applicator stabilizer of FIG. 4 shown to scale. FIG. 7 shows the support structure 30, the support bar 18, and the alignment members 40 in cross section from the side. In this embodiment, the alignment members 40 are implemented as rollers, such as cam followers.

FIG. 8 is a front view of a pressure applicator 22 including a stabilizer with two rollers to prevent the pressure applicator from tilting. FIG. 8 illustrates a preferred configuration for the pressure applicator stabilizer of FIG. 4 shown to scale. FIG. 8 shows the support structure 30, the support bar 18, and the alignment members 40 and 42 from the front. Again in this embodiment, the alignment members 40 and 42 are implemented as rollers. In particular, the support structure 30 of this embodiment includes support plate 50 including a left support surface 52 defined by the left edge of the support plate 50 and a right support surface 54 defined by the right edge of the support plate 50. The alignment member 40 include a first roller located adjacent to the left support surface 52, and the alignment member 42 includes a second roller located adjacent to the right support surface 52.

FIG. 9 shows the same configuration as FIG. 8 except that the alignment member 40 include two roller located adjacent to the left support surface 52, and the alignment member 42 includes one roller located adjacent to the right support surface 52. FIG. 10 shows the same configuration as FIG. 8 except that the alignment member 40 include two roller located adjacent to the left support surface 52, and the alignment member 42 includes two roller located adjacent to the right support surface 52. Other variations to the disclosed embodiments of the invention will be readily apparent to those skilled in the art of corrugated board manufacturing.

In view of the foregoing, it will be appreciated that present invention provides an improved machine for manufacturing corrugated board with pressure applicator stabilizers to prevent the pressure applicators from tilting. It should be understood that the foregoing relates only to the exemplary embodiments of the present invention, and that numerous changes may be made therein without departing from the spirit and scope of the invention as defined by the following claims.

The invention claimed is:

1. A machine for manufacturing corrugated board, comprising:
   a heated platform;
   a conveyor for propelling a web of corrugated board adjacent to the heated platform in a machine direction;
   a row of more than two pressure applicators aligned substantially transverse to the machine direction and configured to press the web of corrugated board against the heated platform; and
   a stabilizer comprising a first connector securing a right end pressure applicator at the right end of the row to a left end pressure applicator at the left end of the row to prevent these pressure applicators from tilting while applying pressure to the web of corrugated board.

2. The machine of claim 1, wherein:
   each pressure applicator is independently weighted; and
   the pressure applicators have weights that are selected to impart a desired pressure profile to the web.

3. The machine of claim 1, further comprising:
   a lifting apparatus for lifting a pressure applicator independently of the other pressure applicators of the row.

4. The machine of claim 1, further comprising:
   a second connector securing a right second position pressure applicator to a left second position pressure applicator;
   the right second position pressure applicator located adjacent to the right end pressure applicator; and
   the left second position pressure applicator located adjacent to the left end pressure applicator.

5. The machine of claim 1, further comprising:
   a support bar selectively supporting the row of pressure applicators;
   the support bar being movable from an upper position to a lower position;
   the support bar configured to lift the pressure applicators above the corrugated board when moved to the upper position, and to permit the pressure applicators to move vertically with respect to the support bar when moved to the lowered position to remove the weight of the pressure applicator from the support bar and to apply the weight of the pressure applicators to the corrugated board; and
   wherein the stabilizer comprises a support structure coupled to a pressure applicator, and one or more alignment members supported by the support bar and configured to limit lateral movement of the support structure to permit the support structure to move vertically with respect to the support bar while preventing the pressure applicator from tilting.

6. The machine of claim 5, wherein each support structure comprises a support surface and the alignment members include an alignment block positioned adjacent to an edge of the support structure.

7. The machine of claim 5, wherein each support structure comprises a support surface and one or more rollers positioned adjacent to an edge of the support structure.

8. The machine of claim 5, wherein each support structure comprises two support surfaces and one roller positioned adjacent to each support surface.

9. The machine of claim 5, wherein each support structure comprises two support surfaces and two rollers positioned adjacent to each support surface.

10. The machine of claim 5, wherein each support structure comprises two support surfaces, two rollers positioned adjacent to one of the surfaces, and one roller positioned adjacent to the other support surface.

11. A machine for manufacturing corrugated board, comprising:
    a heated platform;
    a conveyor for propelling a web of corrugated board adjacent to the heated platform in a machine direction;
    a row of more than two pressure applicators aligned substantially transverse to the machine direction and configured to press the web of corrugated board against the heated platform;
    a first stabilizer comprising a first connector securing a right end pressure applicator at the right end of the row to a left end pressure applicator at the left end of the row to prevent these pressure applicators from tilting while applying pressure to the web of corrugated board
    a second stabilizer comprising a second connector securing opposing second position pressure applicators to each other to prevent the second position pressure applicators from tilting while applying pressure to the web of corrugated board; and wherein each second position pressure applicators is located adjacent to a corresponding end position pressure applicator.

12. The machine of claim 11, further comprising:
    a first support structure coupled to the right end position pressure applicator;
    a second support structure coupled to the left end position pressure applicator; and
    wherein the first connector comprises a strap or bar connecting the left and right support structures to each other.

13. The machine of claim 11, further comprising:
    a first support structure coupled to the right end position pressure applicator;
    a second support structure coupled to the left end position pressure applicator;
    the first connector securing the left and right support structures to each other;
    a third support structure coupled to a right second position pressure applicator;
    a fourth support structure coupled to a left second position pressure applicator; and
    the second connector securing the third and fourth support structures to each other.

14. A machine for manufacturing corrugated board, comprising:

a heated platform;

a conveyor for propelling a web of corrugated board adjacent to the heated platform in a machine direction;

a row of pressure applicators individually weighted to apply desired a pressure profile to the corrugated board, aligned substantially transverse to the machine direction and configured to press the web of corrugated board against the heated platform;

a support bar selectively supporting the row of pressure applicators;

the support bar and being movable from an upper position to a lower position;

the support bar configured to lift the pressure applicators above the corrugated board when moved to the upper position, and to permit the pressure applicators to move vertically with respect to the support bar when moved to the lowered position to remove the weight of the pressure applicator from the support bar and to apply the weight of the pressure applicators to the corrugated board;

a first support structure coupled to a right end pressure applicator at the right end of the row;

one or more alignment members supported by the support bar and positioned adjacent to the first support structure to permit the first support structure to move vertically with respect to the support bar while preventing the right end position pressure applicator from tilting;

a second support structure coupled to a left end pressure applicator at the left end of the row; and one or more alignment members supported by the support bar and positioned adjacent to the second support structure to permit the second support structure to move vertically with respect to the support bar while preventing the left end pressure applicator from tilting.

15. The machine of claim 14, further comprising:

a third support structure coupled to a right second pressure applicator;

one or more alignment members supported by the support bar and positioned adjacent to the third support structure to permit the third support structure to move vertically with respect to the support bar while preventing the right second position pressure applicator from tilting; and a fourth support structure coupled to a left second position pressure applicator;

one or more alignment members supported by the support bar and positioned adjacent to the fourth support structure to permit the fourth support structure to move vertically with respect to the support bar while preventing the left second position pressure applicator from tilting.

16. The machine of claim 15, wherein each support structure is selected from the group consisting essentially of:

a support surface and an alignment block positioned adjacent to the support structure;

a support surface and one or more rollers adjacent to the support surface;

one support surface and two rollers adjacent to the support surface;

two support surfaces and one roller adjacent to each support surface;

two support surfaces and two rollers adjacent to each support surface; and two support surfaces, two rollers adjacent to one of the surfaces, and one roller adjacent to the other support surface.

17. The machine of claim 16, wherein each support structure comprises a support plate attached to the pressure applicator.

* * * * *